(12) United States Patent
Fujimoto et al.

(10) Patent No.: US 9,370,015 B2
(45) Date of Patent: Jun. 14, 2016

(54) RADIO BASE STATION AND COMMUNICATION CONTROL METHOD

(75) Inventors: Shinobu Fujimoto, Yokohama (JP); Nobuaki Takamatsu, Tokyo (JP); Yuuki Nakasato, Oogaki (JP); Masahiro Yagi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 77 days.

(21) Appl. No.: 13/989,764

(22) PCT Filed: Nov. 25, 2011

(86) PCT No.: PCT/JP2011/077258
§ 371 (c)(1),
(2), (4) Date: May 24, 2013

(87) PCT Pub. No.: WO2012/070660
PCT Pub. Date: May 31, 2012

(65) Prior Publication Data
US 2013/0242933 A1 Sep. 19, 2013

(30) Foreign Application Priority Data
Nov. 26, 2010 (JP) ................................. 2010-264390
Nov. 26, 2010 (JP) ................................. 2010-264391

(51) Int. Cl.
| H04W 72/08 | (2009.01) |
| H04L 1/00 | (2006.01) |
| H04L 5/00 | (2006.01) |
| H04B 1/713 | (2011.01) |
| H04L 1/04 | (2006.01) |

(52) U.S. Cl.
CPC ............. *H04W 72/085* (2013.01); *H04B 1/713* (2013.01); *H04L 1/0003* (2013.01); *H04L 1/0009* (2013.01); *H04L 1/04* (2013.01); *H04L 5/0012* (2013.01); *H04L 5/0046* (2013.01)

(58) Field of Classification Search
None
See application file for complete search history.

(56) References Cited

U.S. PATENT DOCUMENTS

| 8,400,909 B2 | 3/2013 | Ofuji et al. |
| 8,422,383 B2 | 4/2013 | Ishii |

(Continued)

FOREIGN PATENT DOCUMENTS

| CN | 101180818 A | 5/2008 |
| CN | 101675702 A | 3/2010 |

(Continued)

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8); pp. 1-83.

(Continued)

*Primary Examiner* — Charles C Jiang
*Assistant Examiner* — George Atkins, Jr.
(74) *Attorney, Agent, or Firm* — Studebaker & Brackett PC

(57) ABSTRACT

An eNB1-1 employs frequency hopping that assigns a radio resource to a UE2-1 in response to switching of a frequency of an SRS from the UE2-1, and determines an MCS in a first radio resource block when a first downlink radio resource block is assigned to the UE2-1, on the basis of SINR acquired for a second downlink radio resource block having a frequency bandwidth equal to a frequency bandwidth of the first downlink radio resource and being assigned to the UE2-1 in the past.

10 Claims, 8 Drawing Sheets

(56) References Cited

U.S. PATENT DOCUMENTS

| | | | |
|---|---|---|---|
| 2003/0202574 A1* | 10/2003 | Budka et al. | 375/227 |
| 2009/0046647 A1 | 2/2009 | Roh et al. | |
| 2009/0046800 A1 | 2/2009 | Xu et al. | |
| 2009/0147748 A1* | 6/2009 | Ofuji et al. | 370/330 |
| 2010/0054147 A1* | 3/2010 | Ishii | 370/252 |
| 2010/0074128 A1 | 3/2010 | Ishii | |
| 2010/0290559 A1 | 11/2010 | Futagi et al. | |
| 2011/0064044 A1 | 3/2011 | Ofuji et al. | |
| 2012/0113875 A1* | 5/2012 | Alanara et al. | 370/280 |

FOREIGN PATENT DOCUMENTS

| | | |
|---|---|---|
| CN | 101843062 A | 9/2010 |
| JP | 2007-151059 A | 6/2007 |
| JP | 2010-536227 A | 11/2010 |
| WO | 2008/105420 A1 | 9/2008 |
| WO | 2009/023681 A2 | 2/2009 |

OTHER PUBLICATIONS

International Search Report; PCT/JP2011/077258; Feb. 14, 2012.
An Office Action; "Notice of Reasons for Rejection," issued by the Japanese Patent Office on Apr. 7, 2015, which corresponds to Japanese Patent Application No. 2010-264390 and is related to U.S. Appl. No. 13/989,764; with English language statement of relevance.
An Office Action issued by the Chinese Patent Office on Jun. 1, 2015, which corresponds to Chinese Patent Application No. 201180056834.9 and is related to U.S. Appl. No. 13/989,764; with English language concise explanation.

* cited by examiner

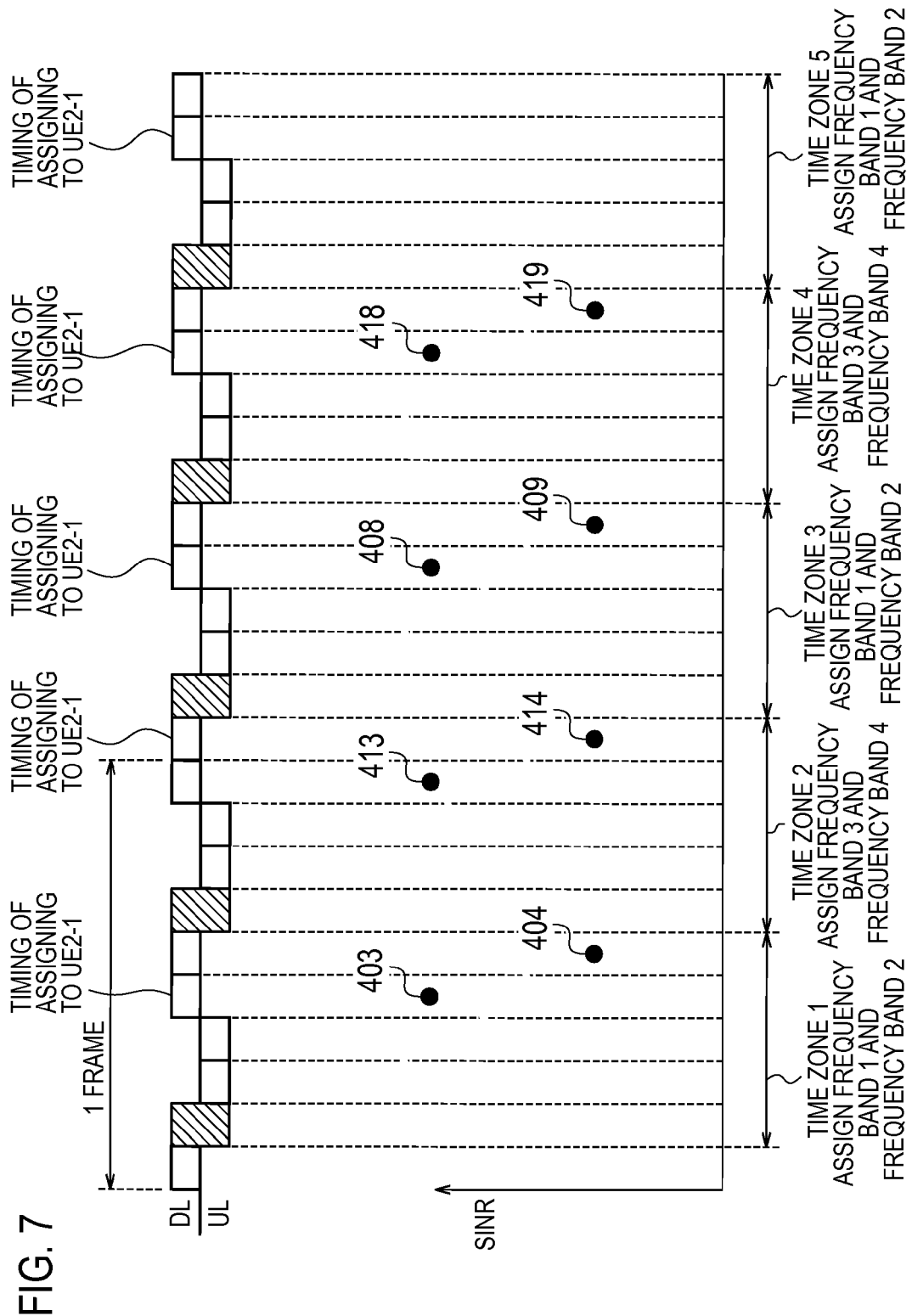

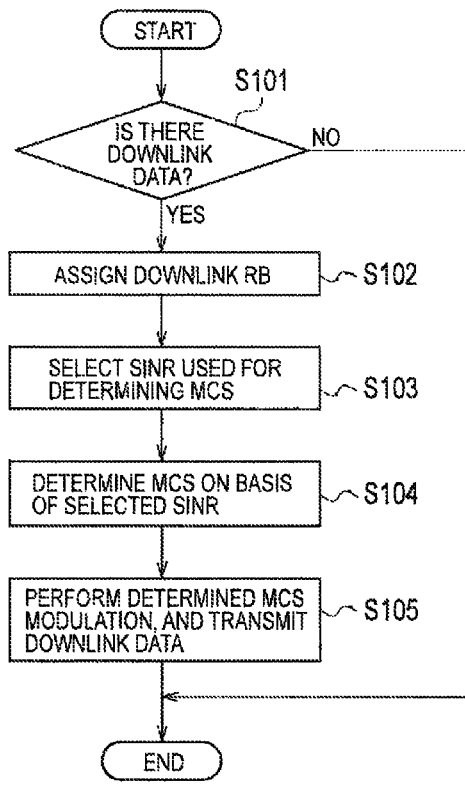

RADIO BASE STATION AND COMMUNICATION CONTROL METHOD

TECHNICAL FIELD

The present invention relates to a radio base station that assigns a radio resource to a radio terminal in response to the switching of a frequency of a reference signal from the radio terminal, and a communication control method in the radio base station.

BACKGROUND ART

According to a radio communication system corresponding to LTE (Long Term Evolution) currently standardized in 3GPP (Third Generation Partnership Project), in radio communication between a radio base station (eNB) and a radio terminal (UE), the eNB assigns a resource block (RB) to the UE as a radio resource (refer to Non Patent Literature 1, for example).

Furthermore, a method of assigning a radio resource to the radio terminal in the radio communication system includes a method of switching a frequency of a radio resource assigned to the radio terminal at any time, which is called frequency hopping. The frequency hopping is employable to a radio communication system such as next generation PHS (eXtended Global Platform: XGP).

CITATION LIST

Non Patent Literature

Non Patent Literature 1: 3GPP TS36.211 V8.7.0 "Physical Channels and Modulation", May 2009

SUMMARY OF THE INVENTION

According to the frequency hopping in the aforementioned XGP radio communication system, a radio base station sets a modulation scheme (for example, BPSK) tolerant to interference for a radio resource to be newly assigned to prevent the breakage of data. Therefore, it is possible to suppress the generation of a retransmission process, but there is a problem that throughput is reduced. Therefore, particularly, in an LTE radio communication system requiring speed-up of throughput, it is not appropriate to employ the frequency hopping in the XGP radio communication system as such.

In view of the above-described problems, the present invention has an object to provide a radio base station and a communication control method, by which it is possible to determine an appropriate modulation scheme without reducing throughput.

In order to solve the aforementioned problems, the present invention has following features. The feature of the present invention is summarized as follows. A radio base station (eNB1-1) that assigns a radio resource (RB) to a radio terminal (UE2-1) in response to switching of a frequency of a reference signal from the radio terminal, comprises: a determination unit that determines a modulation scheme (MCS: Modulation and Coding Scheme) in the radio resource, wherein the determination unit (MCS determination unit 116) determines a modulation scheme in a latest first radio resource assigned to the radio terminal, on the basis of quality information (CQU, SINR) acquired for a second radio resource having a frequency bandwidth equal to a frequency bandwidth of the first radio resource and being assigned to the radio terminal in the past.

Such a radio base station employs frequency hopping in which a radio resource is assigned to the radio terminal in response to the switching of a frequency of a reference signal from the radio terminal, and determines a modulation scheme in a first radio resource on the basis of quality information acquired for a second radio resource when the first radio resource is assigned to the radio terminal, the second radio resource having a frequency bandwidth equal to that of the first radio resource and being assigned to the radio terminal in the past. Consequently, the radio base station is able to use past quality information corresponding to the frequency bandwidth of the first radio resource when determining the modulation scheme in the first radio resource, and to determine an appropriate modulation scheme without reducing throughput.

The feature of the present invention is summarized as follows. The determination unit determines the modulation scheme in the latest first radio resource assigned to the radio terminal, on the basis of quality information acquired at the timing when a temporal position in a period of a reception cycle of the reference signal is equal to the first radio resource.

The feature of the present invention is summarized as follows. The determination unit determines the modulation scheme in the first radio resource on the basis of latest quality information among a plurality of quality information acquired for the second radio resource in the past.

The feature of the present invention is summarized as follows. The determination unit determines the modulation scheme in the first radio resource on the basis of an average value of values of quality indicated by a plurality of quality information acquired for the second radio resource in the past.

The feature of the present invention is summarized as follows. The determination unit determines the modulation scheme in the first radio resource on the basis of a weighted average value of values of quality indicated by a plurality of quality information acquired for the second radio resource in the past, in which a weighting coefficient is increased as an elapsed time from acquirement of the plurality of quality information is shorter.

The feature of the present invention is summarized as follows. A communication control method in a radio base station that assigns a radio resource to a radio terminal in response to switching of a frequency of a reference signal from the radio terminal, comprises: a step of determining a modulation scheme in the radio resource, wherein in the step of determining, a modulation scheme in a latest first radio resource assigned to the radio terminal is determined on the basis of quality information acquired for a second radio resource having a frequency bandwidth equal to a frequency bandwidth of the first radio resource and being assigned to the radio terminal in the past.

The feature of the present invention is summarized as follows. A radio base station (eNB1-1) that assigns a radio resource (RB) to a radio terminal (UE2-1) in response to switching of a frequency of a reference signal from the radio terminal, comprises: a determination unit (MCS determination unit 116) that determines a modulation scheme (MCS: Modulation and Coding Scheme) in the radio resource, wherein the determination unit determines a modulation scheme in a latest first radio resource assigned to the radio terminal, on the basis of quality information (CQI, SINR) acquired for a second radio resource having a frequency bandwidth different from a frequency bandwidth of the first radio resource and being assigned to the radio terminal in the past.

Such a radio base station employs frequency hopping in which a radio resource is assigned to the radio terminal in response to the switching of a frequency of a reference signal from the radio terminal, and determines a modulation scheme in a first radio resource on the basis of quality information acquired for a second radio resource when the first radio resource is assigned to the radio terminal, the second radio resource having a frequency bandwidth different from that of the first radio resource and being assigned to the radio terminal. Consequently, the radio base station is able to use past quality information of the second radio resource when determining the modulation scheme in the first radio resource, and to determine an appropriate modulation scheme without reducing throughput.

The feature of the present invention is summarized as follows. The determination unit determines the modulation scheme in the latest first radio resource assigned to the radio terminal, on the basis of quality information acquired at the timing when a temporal position in a period of a reception cycle of the reference signal is equal to the first radio resource.

The feature of the present invention is summarized as follows. The determination unit determines the modulation scheme in the first radio resource on the basis of latest quality information among a plurality of quality information acquired for the second radio resource in the past.

The feature of the present invention is summarized as follows. The determination unit determines the modulation scheme in the first radio resource on the basis of an average value of values of quality indicated by a plurality of quality information acquired for the second radio resource in the past.

The feature of the present invention is summarized as follows. The determination unit determines the modulation scheme in the first radio resource on the basis of a weighted average value of values of quality indicated by a plurality of quality information acquired for the second radio resource in the past, in which a weighting coefficient is increased as an elapsed time from acquirement of the plurality of quality information is shorter. The feature of the present invention is summarized as follows. A communication control method in a radio base station that assigns a radio resource to a radio terminal in response to switching of a frequency of a reference signal from the radio terminal, comprises: a step of determining a modulation scheme in the radio resource, wherein in the step of determining, a modulation scheme in a latest first radio resource assigned to the radio terminal is determined on the basis of quality information acquired for a second radio resource having a frequency bandwidth different from a frequency bandwidth of the first radio resource and being assigned to the radio terminal in the past.

BRIEF DESCRIPTION OF THE DRAWINGS

FIG. 7 is a diagram illustrating SINR indicated by the CQI information notified by the UE to the eNB according to an embodiment of the present invention.

FIG. 8 is a flowchart illustrating the operation of the radio base station according to an embodiment of the present invention.

DESCRIPTION OF THE EMBODIMENTS

Figure 1:
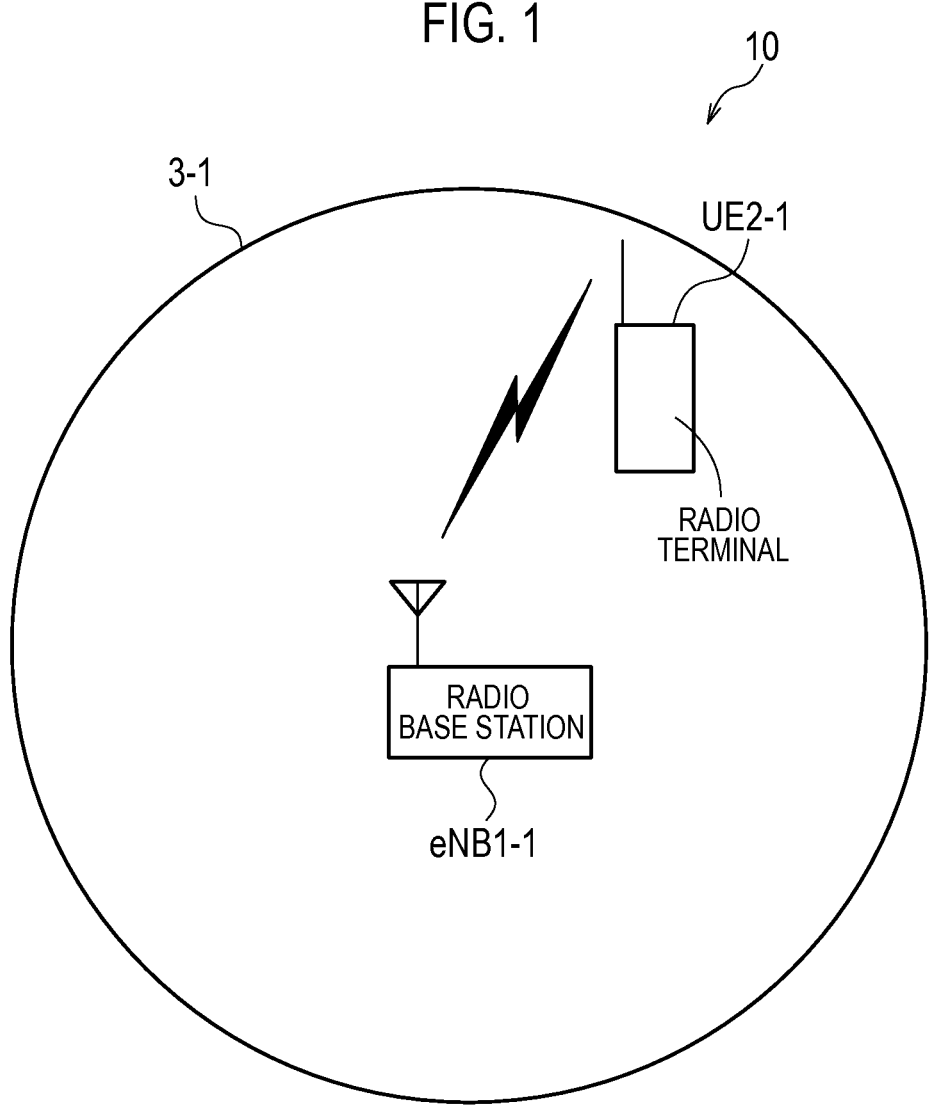
FIG. 1 is a diagram illustrating the entire schematic configuration of a radio communication system according to an embodiment of the present invention.

Next, with reference to the drawings, the embodiments of the present invention will be described. Specifically, the description will be given in the order of a configuration of a radio communication system, the configuration of a radio base station, the operation of the radio base station, the operation and effect, and the other embodiments. In the drawings of the embodiment as will be described below, the same or similar reference numerals are applied to the same or similar portions.

(1) Configuration of Radio Communication System

FIG. 1 is a diagram illustrating the entire schematic configuration of a radio communication system 10 according to the embodiment of the present invention.

The radio communication system 10 illustrated in FIG. 1 is a TDD-LTE radio communication system. The radio communication system 10 includes a radio base station (eNB) 1-1 and a radio terminal (UE) 2-1.

The UE 2-1 is an object to which a resource block is assigned by the eNB 1-1. In this case, when the eNB 1-1 is used as a reference, the UE 2-1 is a serving radio terminal.

Time Division Duplex is employed in radio communication between the eNB 1-1 and the UE 2-1, OFDMA (Orthogonal Frequency Division Multiplexing Access) is employed in downlink radio communication, and SC-FDMA (Single Carrier Frequency Division Multiple Access) is employed in uplink radio communication. The downlink indicates a direction from the eNB 1-1 to the UE 2-1. The uplink indicates a direction from the UE 2-1 to the eNB 1-1.

The eNB 1-1 assigns a resource block (RB) to the UE 2-1 in a cell 3-1 as a radio resource.

The resource block includes a downlink resource block (downlink RB) to be used in the downlink radio communication and an uplink resource block (uplink RB) to be used in the uplink radio communication. A plurality of downlink resource blocks are arranged in the frequency direction and the time direction. Similarly, a plurality of uplink resource blocks are arranged in the frequency direction and the time direction.

Figure 2:
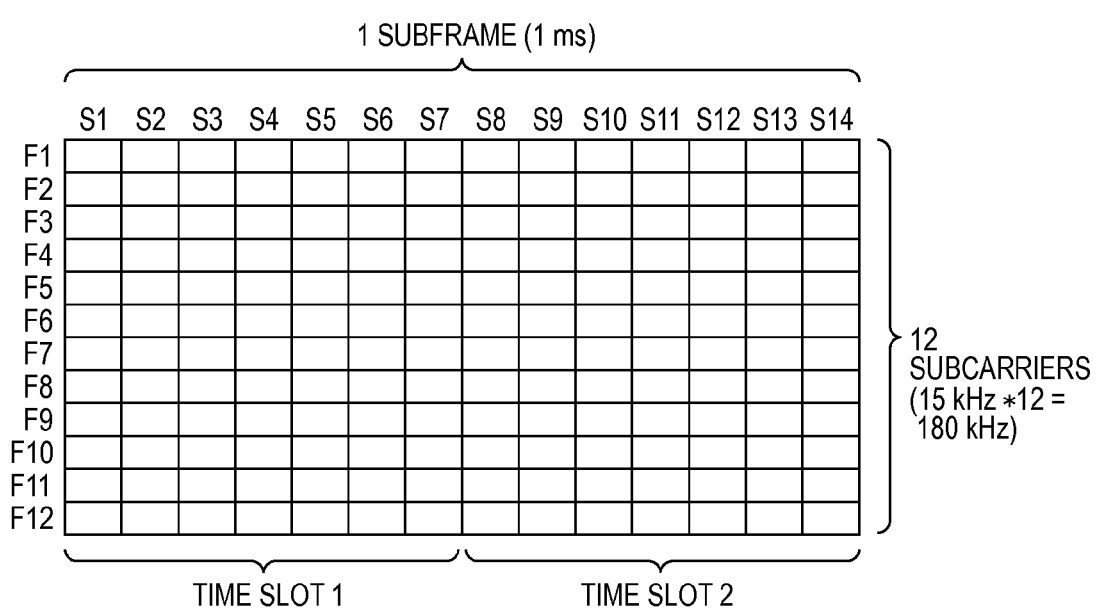
FIG. 2 is a diagram illustrating a format of the resource block according to an embodiment of the present invention.

FIG. 2 is a diagram illustrating a format of the resource block. The resource block is configured in one subframe having a time length of 1 [ms] in the time direction. The subframe includes a time zone S1 to a time zone S14. Among the time zone S1 to the time zone S14, the symbol S1 to the symbol S7 constitute a first half time slot (a time slot 1) and the symbol S8 to the symbol S14 constitute a latter half time slot (a time slot 2). Furthermore, the time slots 1 and 2 correspond to resource blocks.

As illustrated in FIG. 2, the resource block has a frequency width of 180 [kHz] in the frequency direction. Furthermore, the resource block includes 12 subcarriers F1 to F12 having a frequency width of 15 [kHz].

Figure 3A:
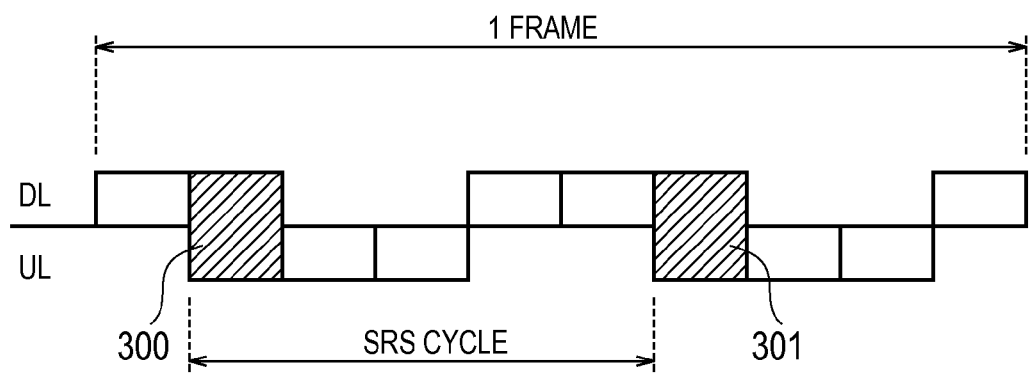
FIG. 3 is a diagram illustrating a format of the frame according to an embodiment of the present invention.
Figure 3B:
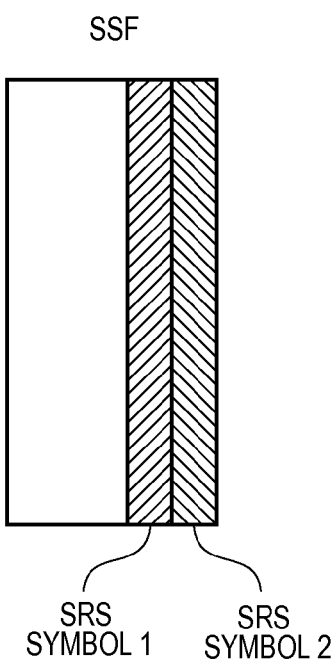

Furthermore, in the time direction, a plurality of subframes constitute one frame. FIG. 3 is a diagram illustrating a format of the frame. The frame illustrated in FIG. 3(a) includes 10 subframes. The 10 subframes are included in the frame in the sequence of a subframe of a downlink resource block, a subframe (a front special subframe: SSF) 300 of both a downlink resource block and an uplink resource block, a subframe of an uplink resource block, a subframe of an uplink resource block, a subframe of a downlink resource block, a subframe of a downlink resource block, a rear special subframe 301, a subframe of an uplink resource block, a subframe of an uplink resource block, and a subframe of a downlink resource block.

In the special subframes, within the subframe, the first half time slot is used for downlink radio communication and the latter half time slot is used for uplink radio communication across a guard time. Also, as illustrated in FIG. 3(*b*), the special subframe includes an SRS symbol 1 and an SRS symbol 2 corresponding to a transmission time zone of SRS, at the end.

In the frequency direction, an entire frequency band of a radio resource available in radio communication between the eNB 1-1 and the UE 2-1, in other words, a frequency band (an assignment frequency band) assignable to the UE 2-1 has a bandwidth corresponding to the number of a plurality of resource blocks.

Figure 4:
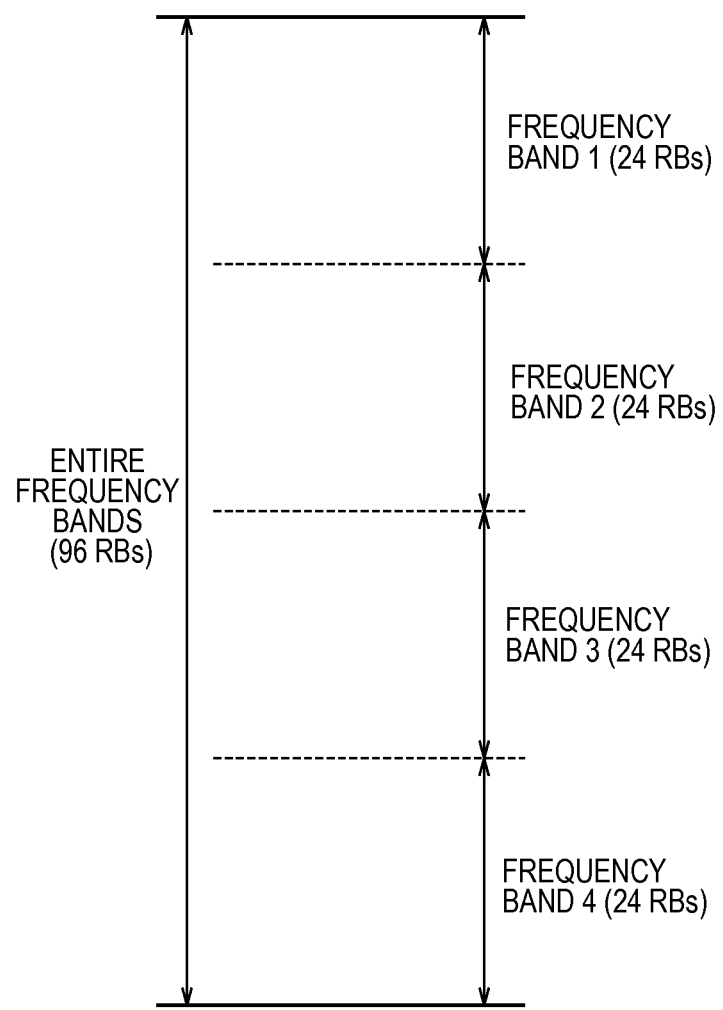
FIG. 4 is a diagram illustrating the configuration of a frequency band available in radio communication between the eNB and the UE according to an embodiment of the present invention.

FIG. 4 is a diagram illustrating the configuration of a frequency band available in radio communication between the eNB 1-1 and the UE 2-1. The entire frequency band available in the radio communication between the eNB 1-1 and the UE 2-1 is a bandwidth corresponding to 100 resource blocks. Hereinafter, as illustrated in FIG. 4, it is assumed that a bandwidth corresponding to 96 resource blocks is used as the frequency band available in the radio communication between the eNB 1-1 and the UE 2-1. Furthermore, the frequency band is divided into a frequency band 1 to a frequency band 4, wherein each frequency band has a bandwidth corresponding to 24 resource blocks.

The downlink resource block is configured by a control information channel (PDCCH: Physical Downlink Control CHannel) for downlink control information transmission and a shared data channel (PDSCH: Physical Downlink Shared CHannel) for downlink user data transmission, in the time direction.

Meanwhile, the uplink resource block includes a control information channel (PUCCH: Physical Uplink Control CHannel) for uplink control information transmission at both ends of a frequency band available in the uplink radio communication, and a shared data channel (PUSCH: Physical Uplink Shared CHannel) for uplink user data transmission at the center part thereof.

(2) Configuration of eNB

Figure 5:
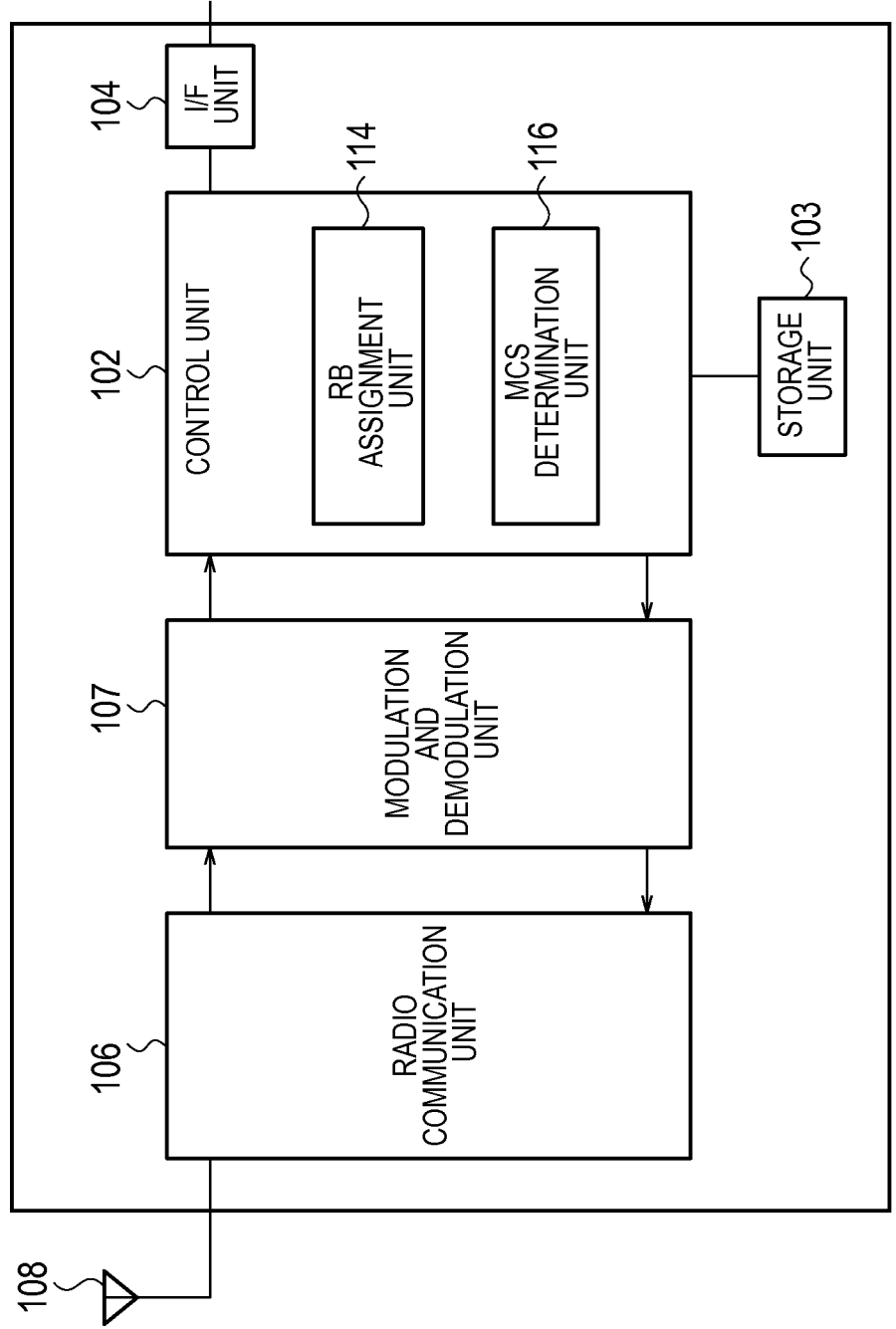
FIG. 5 is a configuration diagram of the eNB according to an embodiment of the present invention.

FIG. 5 is a configuration diagram of the eNB 1-1. As illustrated in FIG. 5, the eNB 1-1 includes a control unit 102, a storage unit 103, an I/F unit 104, a radio communication unit 106, a modulation and demodulation unit 107, and an antenna 108.

The control unit 102, for example, is configured by a CPU, and controls various functions of the eNB 1-1. The control unit 102 includes a resource block (RB) assignment unit 114 and an MCS (Modulation and Coding Scheme) determination unit 116. The storage unit 103, for example, is configured by a memory, and stores various information used for the control and the like of the eNB 1-1.

The I/F unit 104 is able to communicate with another eNB (not illustrated) through an X2 interface. Furthermore, the I/F unit 104 is able to communicate with EPC (Evolved Packet Core) that is not illustrated in the diagram, more specifically, with MME (Mobility Management Entity)/S-GW (Serving Gateway) through an S1 interface.

The radio communication unit 106 receives an uplink radio signal transmitted from the UE 2-1 through the antenna 108. Moreover, the radio communication unit 106 converts (down-converts) the received uplink radio signal to a baseband signal, and outputs the baseband signal to the modulation and demodulation unit 107.

The modulation and demodulation unit 107 performs demodulation and decoding processes for the input baseband signal. In this way, data to be included in the uplink radio signal transmitted by the UE 2-1 is obtained. The data is output to the control unit 102.

Furthermore, the modulation and demodulation unit 107 performs encoding and modulation of data from the control unit 102, thereby obtaining a baseband signal. The radio communication unit 106 converts (up-converts) the baseband signal to a downlink radio signal. Moreover, the radio communication unit 106 transmits the downlink radio signal through the antenna 108.

The control unit 102 sets, in the UE 2-1, a frequency band (an SRS transmission frequency band) that is used when the UE 2-1 transmits a sounding reference signal (SRS) at the timing of a special subframe. The SRS is an uplink radio signal of a radio frequency band.

In the present embodiment, in relation to the SRS transmission frequency band, the frequency band 1 to the frequency band 4 illustrated in FIG. 4 are regularly and alternately switched. In the case of setting the SRS transmission frequency band when the UE 2-1 transmits the SRS at the timing of a special subframe in a predetermined frame, the control unit 102 transmits, to the UE 2-1, an RRC Connection Reconfiguration message including information on the SRS transmission frequency band set at the timing of the final downlink resource block of a frame which is two frames ahead of the predetermined frame. The information on the SRS transmission frequency band includes a parameter corresponding to a bandwidth of the frequency band 1 and the frequency band 2, a parameter corresponding to a bandwidth of the frequency band 3 and the frequency band 4, and information on the SRS symbol 1 or information on the SRS symbol 2, and is set in SoundingRS-UL-Config that is an information element of the RRC Connection Reconfiguration message.

The UE 2-1 receives the RRC Connection Reconfiguration message including the information on the SRS transmission frequency band. Moreover, the UE 2-1 extracts the parameter corresponding to the bandwidth of the frequency band 1 and the frequency band 2, the parameter corresponding to the bandwidth of the frequency band 3 and the frequency band 4, and the information on the SRS symbol 1 or the information on the SRS symbol 2 from the RRC Connection Reconfiguration message. Moreover, the UE 2-1 performs a process (SRS hopping transmission) of transmitting SRS of the frequency band 1 and the frequency band 2 at the timing of the extracted SRS symbol 1 or SRS symbol 2 of a front special subframe in a frame which is two frames behind the frame of the reception timing, and transmitting SRS of the frequency band 3 and the frequency band 4 at the timing of the extracted SRS symbol 1 or SRS symbol 2 of a rear special subframe.

The RB assignment unit 114 of the control unit 102 of the eNB 1-1 receives the SRS through the antenna 108, the radio communication unit 106, and the modulation and demodulation unit 107.

Moreover, the RB assignment unit 114 determines whether there is data (downlink data) to be transmitted to the UE 2-1. When there is the downlink data, the RB assignment unit 114 assigns a downlink resource block to the UE 2-1. Furthermore, the RB assignment unit 114 assigns the downlink resource block to the UE 2-1 in response to the switching of the SRS frequency band based on the SRS hopping transmission in the UE 2-1.

Figure 6:
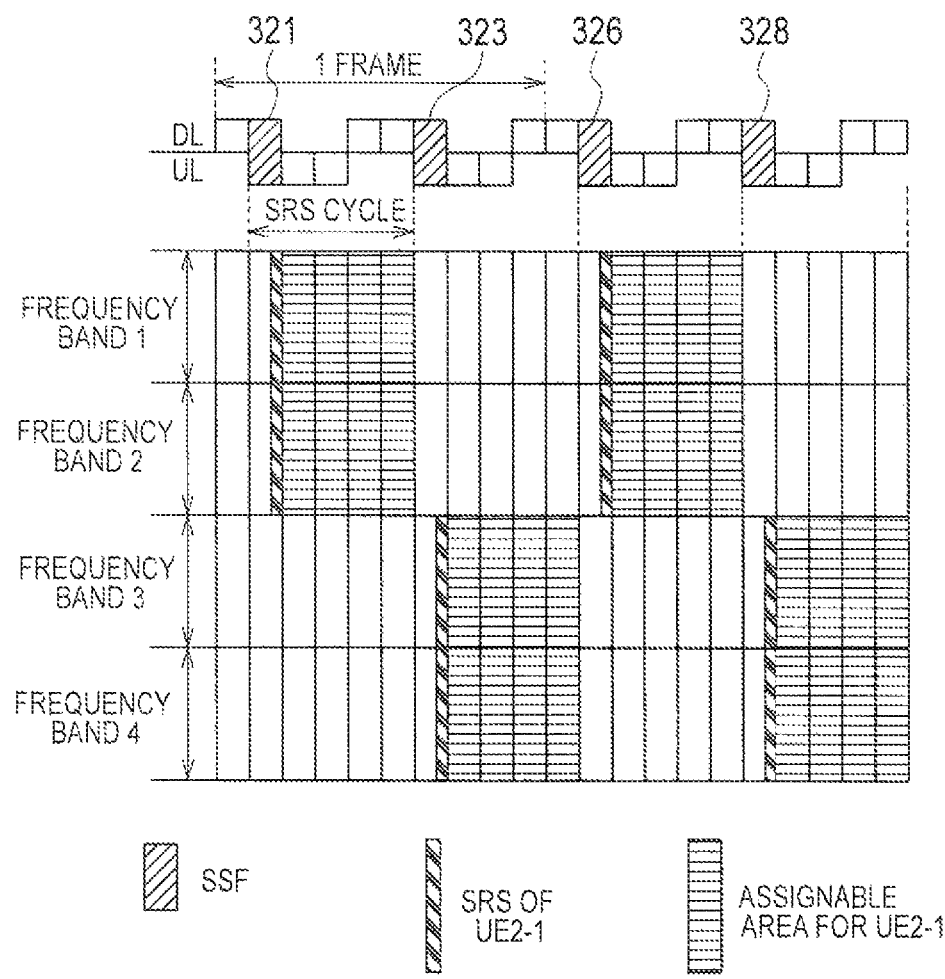
FIG. 6 is a diagram illustrating an example of correspondence between the SRS frequency band and the assigned downlink RB according to an embodiment of the present invention.

Specifically, as illustrated in FIG. 6, the RB assignment unit 114 sets resource blocks between a special subframe having the frequency band of the latest SRS received and including the reception timing of the latest SRS, and a next special subframe, as an assignable area (a UE-assignable area) for the UE 2-1. The UE-assignable area includes subframes of two downlink resource blocks.

Next, the RB assignment unit 114 assigns, to the UE 2-1, a subframe of a downlink resource block of any one of time zones among the subframes of two downlink resource blocks included in the UE-assignable area.

Specifically, when the reception timing of the latest SRS is the timing of the SRS symbol 1, the RB assignment unit 114 selects a time zone of a subframe of a front downlink resource block, among the subframes of two downlink resource blocks included in the UE-assignable area, as a time zone of a downlink resource block to be assigned. Furthermore, when the reception timing of the latest SRS is the timing of the SRS symbol 2, the RB assignment unit 114 selects a time zone of a subframe of a rear downlink resource block, among the subframes of two downlink resource blocks included in the UE-assignable area, as a time zone of a subframe of a downlink resource block to be assigned.

Moreover, the RB assignment unit 114 generates a downlink RB assignment value capable of uniquely designating the selected frequency band and time zone of the subframe of the downlink resource block. The downlink RB assignment value is obtained by a process of a medium access control (MAC) layer. The downlink RB assignment value includes a resource block number indicating information for uniquely identifying the frequency band and the time zone of the subframe of the downlink resource block that is assigned to the UE 2-1.

The RB assignment unit 114 transmits information on the downlink RB assignment value to the UE 2-1 through the modulation and demodulation unit 107, the radio communication unit 106, and the antenna 108.

The MCS determination unit 116 selects MCS when downlink data is transmitted using the subframe of the downlink resource block assigned to the UE 2-1. Here, the UE 2-1 transmits, to the eNB 1-1, CQI (Channel Quality Indicator) information corresponding to the frequency band 1 to the frequency band 4 of each subframe of the assigned downlink resource block. When the CQI information is received, the MCS determination unit 116 acquires SINR (Signal to Interference and Noise power Ratio) corresponding to the CQI information.

FIG. 7 is a diagram illustrating SINR indicated by the CQI information notified by the UE 2-1 to the eNB 1-1. FIG. 7 is an example of the case in which the subframes of two downlink resource blocks included in the UE-assignable area are assigned to the UE 2-1.

A time zone 1 to a time zone 5 illustrated in FIG. 7 indicate periods of an SRS reception cycle, in other words, periods of 5 [ms] that is an assignment cycle of a downlink radio resource for the UE 2-1.

In the time zone 1, the UE 2-1 is assigned downlink resource blocks of the frequency band 1 and the frequency band 2. In this case, the UE 2-1 transmits CQI information corresponding to the frequency band 1 to the frequency band 4 of subframes of assigned downlink resource blocks among four subframes other than a special subframe in the time zone 1. SINRs corresponding to the frequency band 1 and the frequency band 2 have values indicated by 403 and 404.

In the time zone 2, the UE 2-1 is assigned downlink resource blocks of the frequency band 3 and the frequency band 4. In this case, the UE 2-1 transmits CQI information corresponding to the frequency band 1 to the frequency band 4 of subframes of assigned downlink resource blocks among four subframes other than a special subframe in the time zone 2. SINRs corresponding to the frequency band 1 and the frequency band 2 have values indicated by 413 and 414.

In the time zone 3, similarly to the time zone 1, the UE 2-1 is assigned downlink resource blocks of the frequency band 1 and the frequency band 2. In this case, the UE 2-1 transmits CQI information corresponding to the frequency band 1 to the frequency band 4 of subframes of assigned downlink resource blocks among four subframes other than a special subframe in the time zone 1. SINRs corresponding to the frequency band 1 and the frequency band 2 have values indicated by 408 and 409.

In the time zone 4, similarly to the time zone 2, the UE 2-1 is assigned downlink resource blocks of the frequency band 3 and the frequency band 4. In this case, the UE 2-1 transmits CQI information corresponding to the frequency band 1 to the frequency band 4 of subframes of assigned downlink resource blocks among four subframes other than a special subframe in the time zone 2. SINRs corresponding to the frequency band 1 and the frequency band 2 have values indicated by 418 and 419.

As apparent from FIG. 7, the two SINRs of each time zone are decreased as an elapsed time from the assignment of a resource block to the UE 2-1 in a time zone which is one time zone ahead of the time zone becomes longer.

Hereinafter, a description will be provided for a first process to a fourth process that are determination processes of MCS in the downlink resource blocks of the frequency band 1 and the frequency band 2 assigned to the UE 2-1 by the eNB 1-1 in the time zone 5 in such situations.

First Embodiment

Firstly, the first process to the fourth process according to a first embodiment will be described.

(First Process)

The MCS determination unit 116 selects the latest time zone 3 from the time zone 1 and the time zone 3 that are time zones in which the downlink resource blocks of the frequency band 1 and the frequency band 2 were assigned to the UE 2-1 in the past, in other words, downlink resource blocks equal to those of the frequency band 1 and the frequency band 2 to be assigned in the time zone 5 were assigned. Next, the MCS determination unit 116 selects SINR 408, from the two SINRs in the time zone 3, which is SINR of which the temporal position in the time zone 3 was acquired at the same timing as that of the downlink resource blocks of the frequency band 1 and the frequency band 2 to be assigned in the time zone 5, as SINR to be used to determine MCS.

Next, the MCS determination unit 116 determines MCS in the downlink resource blocks of the frequency band 1 and the frequency band 2 to be assigned in the time zone 5, on the basis of the selected SINR 408. Furthermore, the MCS determination unit 116 determines the MCS such that throughput is increased as the SINR 408 is higher.

(Second Process)

The MCS determination unit 116 selects the latest time zone 3 from the time zone 1 and the time zone 3 that are time zones in which the downlink resource blocks of the frequency band 1 and the frequency band 2 were assigned to the UE 2-1 in the past, in other words, downlink resource blocks equal to those of the frequency band 1 and the frequency band 2 to be assigned in the time zone 5 were assigned. Next, the MCS determination unit 116 selects an SINR 409 that is the latest SINR of the two SINRs in the time zone 3.

Next, the MCS determination unit 116 determines the MCS in the downlink resource blocks of the frequency band 1 and the frequency band 2 to be assigned in the time zone 5, on the basis of the selected SINR 409. Furthermore, the MCS determination unit 116 determines the MCS such that throughput is increased as the SINR 409 is higher.

(Third Process)

The MCS determination unit 116 selects the latest time zone 3 from the time zone 1 and the time zone 3 that are time zones in which the downlink resource blocks of the frequency band 1 and the frequency band 2 were assigned to the UE 2-1 in the past, in other words, downlink resource blocks equal to those of the frequency band 1 and the frequency band 2 to be assigned in the time zone 5 were assigned. Next, the MCS determination unit 116 calculates an average value of the two SINRs 408 and 409 in the time zone 3.

Next, the MCS determination unit 116 determines the MCS in the downlink resource blocks of the frequency band 1 and the frequency band 2 to be assigned in the time zone 5, on the basis of the calculated average value of the SINRs. Furthermore, the MCS determination unit 116 determines the MCS such that throughput is increased as the average value of the SINRs is higher.

(Fourth Process)

The MCS determination unit 116 selects the time zone 1 and the time zone 3 that are time zones in which the downlink resource blocks of the frequency band 1 and the frequency band 2 were assigned to the UE 2-1 in the past, in other words, downlink resource blocks equal to those of the frequency band 1 and the frequency band 2 to be assigned in the time zone 5 were assigned. Next, the MCS determination unit 116 selects the SINR 408, from the two SINRs 408 and 409 in the time zone 3, which is SINR of which the temporal position in the time zone 3 was acquired at the same timing as that of the downlink resource blocks of the frequency band 1 and the frequency band 2 to be assigned in the time zone 5, as SINR to be used to determine MCS. Furthermore, the MCS determination unit 116 selects the SINR 403, from the two SINRs 403 and 404 in the time zone 1, which is SINR of which the temporal position in the time zone 1 was acquired at the same timing as that of the downlink resource blocks of the frequency band 1 and the frequency band 2 to be assigned in the time zone 5, as SINR to be used to determine MCS.

Next, the MCS determination unit 116 determines a weighting coefficient such that the weighting coefficient is increased as an elapsed time from the reception of CQI information corresponding to the SINRs is shorter, for the selected SINRs 408 and 403. Moreover, the MCS determination unit 116 calculates a weighted average value of the SINR 408 and the SINR 403 using the weighting coefficient. For example, when a value equal to or larger than 0.5 and smaller than 1 is used as a weighting coefficient $\gamma$ for the SINR 408, the weighted average value of the SINR 408 and the SINR 403 is (a value of the SINR 408)×$\gamma$+(a value of the SINR 403)×(1−$\gamma$). In addition, the $\gamma$, for example, may be a PF (Proportional Fair) value indicating the priority of resource block assignment to the UE 2-1 in a PF scheme.

The MCS determination unit 116 outputs the MCS determined in one of the aforementioned first process to fourth process, to the modulation and demodulation unit 107. The modulation and demodulation unit 107 modulates downlink data in response to the determined MCS, and transmits the modulated downlink data to the UE 2-1 through the radio communication unit 106 and the antenna 108.

Second Embodiment

Next, the first process to the fourth process according to a second embodiment will be described.

(First Process)

The MCS determination unit 116 selects the latest time zone 4 from the time zone 2 and the time zone 4 that are time zones in which the downlink resource blocks of the frequency band 3 and the frequency band 4 were assigned to the UE 2-1 in the past, in other words, downlink resource blocks of the frequency bands 3 and 4 different from those of the frequency band 1 and the frequency band 2 to be assigned in the time zone 5 were assigned. Next, the MCS determination unit 116 selects the SINR 418, from the two SINRs in the time zone 4, which is SINR of which the temporal position in the time zone 4 was acquired at the same timing as that of the downlink resource blocks of the frequency band 1 and the frequency band 2 to be assigned in the time zone 5, as SINR to be used to determine MCS.

Next, the MCS determination unit 116 determines MCS in the downlink resource blocks of the frequency band 1 and the frequency band 2 to be assigned in the time zone 5, on the basis of the selected SINR 418. Furthermore, the MCS determination unit 116 determines the MCS such that throughput is increased as the SINR 418 is higher.

(Second Process)

The MCS determination unit 116 selects the latest time zone 4 from the time zone 2 and the time zone 4 that are time zones in which the downlink resource blocks of the frequency band 3 and the frequency band 4 were assigned to the UE 2-1 in the past, in other words, downlink resource blocks of the frequency bands 3 and 4 different from those of the frequency band 1 and the frequency band 2 to be assigned in the time zone 5 were assigned. Next, the MCS determination unit 116 selects SINR 419 that is the latest SINR of the two SINRs in the time zone 4.

Next, the MCS determination unit 116 determines the MCS in the downlink resource blocks of the frequency band 1 and the frequency band 2 to be assigned in the time zone 5, on the basis of the selected SINR 419. Furthermore, the MCS determination unit 116 determines the MCS such that throughput is increased as the SINR 419 is higher.

(Third Process)

The MCS determination unit 116 selects the latest time zone 4 from the time zone 2 and the time zone 4 that are time zones in which the downlink resource blocks of the frequency band 3 and the frequency band 4 were assigned to the UE 2-1 in the past, in other words, downlink resource blocks of the frequency bands 3 and 4 different from those of the frequency band 1 and the frequency band 2 to be assigned in the time zone 5 were assigned. Next, the MCS determination unit 116 calculates an average value of the two SINRs 418 and 419 in the time zone 4.

Next, the MCS determination unit 116 determines the MCS in the downlink resource blocks of the frequency band 1 and the frequency band 2 to be assigned in the time zone 5, on the basis of the calculated average value of the SINRs. Furthermore, the MCS determination unit 116 determines the MCS such that throughput is increased as the average value of the SINRs is higher.

(Fourth Process)

The MCS determination unit 116 selects the time zone 2 and the time zone 4 that are time zones in which the downlink resource blocks of the frequency band 3 and the frequency band 4 were assigned to the UE 2-1 in the past, in other words, downlink resource blocks of the frequency bands 3 and 4 different from those of the frequency band 1 and the frequency band 2 to be assigned in the time zone 5 were assigned.

Next, the MCS determination unit 116 selects the SINR 418, from the two SINRs in the time zone 4, which is SINR of which the temporal position in the time zone 4 was acquired at the same timing as that of the downlink resource blocks of the frequency band 1 and the frequency band 2 to be assigned in the time zone 5, as SINR to be used to determine MCS. Furthermore, the MCS determination unit 116 selects the SINR 413 of the two SINRs 413 and 414 in the time zone 2, which is SINR of which the temporal position in the time zone 2 was acquired at the same timing as that of the downlink resource blocks of the frequency band 1 and the frequency band 2 to be assigned in the time zone 5, as SINR to be used to determine MCS.

Next, the MCS determination unit 116 determines a weighting coefficient such that the weighting coefficient is increased as an elapsed time from the reception of CQI information corresponding to the SINRs is shorter for the selected SINRs 418 and 413. Moreover, the MCS determination unit 116 calculates a weighted average value of the SINR 418 and the SINR 413 using the weighting coefficient. For example, when a value equal to or larger than 0.5 and smaller than 1 is used as a weighting coefficient $\gamma$ for the SINR 418, the weighted average value of the SINR 418 and the SINR 413 is (a value of the SINR 418)×$\gamma$+(a value of the SINR 413)×(1−$\gamma$). In addition, the $\gamma$, for example, may be a PF (Proportional Fair) value indicating the priority of resource block assignment to the UE 2-1 in a PF scheme.

The MCS determination unit 116 outputs the MCS determined in one of the aforementioned first process to fourth process, to the modulation and demodulation unit 107. The modulation and demodulation unit 107 modulates downlink data in response to the determined MCS, and transmits the modulated downlink data to the UE 2-1 through the radio communication unit 106 and the antenna 108.

(3) Operation of eNB

FIG. 8 is a flowchart illustrating the operation of the eNB 1-1.

In step S101, the eNB 1-1 determines whether there is data (downlink data) to be transmitted to the UE 2-1. When there is no downlink data, a series of operations are ended.

Meanwhile, when there is the downlink data, the eNB 1-1 assigns a downlink resource block to the UE 2-1 in step S102.

In step S103, the eNB 1-1 selects SINR to be used to determine MCS. A specific selection technique is as described in the first process to the fourth process in the aforementioned first embodiment or second embodiment.

In step S104, the eNB 1-1 determines MCS on the basis of the selected SINR. A specific determination technique is as described in the aforementioned first process to fourth process.

In step S105, the eNB 1-1 modulates the downlink data in response to the determined MCS, and transmits the modulated downlink data to the UE 2-1.

(4) Operation and Effect

As described above, according to the first embodiment, the eNB 1-1 employs frequency hopping in which a resource block is assigned to the UE 2-1 in response to the switching of a frequency of SRS from the UE 2-1, and determines MCS in a first resource block on the basis of SINR acquired for a second downlink resource block when the first downlink resource block is assigned to the UE 2-1, the second downlink resource block having a frequency bandwidth equal to that of the first downlink resource block and being assigned to the UE 2-1 in the past.

Consequently, the eNB 1-1 is able to use past SINR corresponding to the frequency bandwidth of the first downlink resource block when determining the MCS in the first downlink resource block, and to determine appropriate MCS without reducing throughput.

Furthermore, according to the second embodiment, the eNB 1-1 employs frequency hopping in which a resource block is assigned to the UE 2-1 in response to the switching of a frequency of SRS from the UE 2-1, and determines MCS in a first resource block on the basis of SINR acquired for a second downlink resource block when the first downlink resource block is assigned to the UE 2-1, the second downlink resource block having a frequency bandwidth different from that of the first downlink resource block and being assigned to the UE 2-1 in the past.

Consequently, the eNB 1-1 is able to use past SINR corresponding to the frequency bandwidth of the second downlink resource block when determining the MCS in the first downlink resource block, and to determine appropriate MCS without reducing throughput.

(5) Other Embodiments

As described above, the present invention has been described according to the embodiments. However, it must not be understood that the discussions and the drawings constituting a part of this disclosure limit the present invention. From this disclosure, various alternative embodiments, examples and operational techniques are apparent to those skilled in the art.

In the aforementioned embodiments, the timing of the special subframe was used as the transmission timing of SRS in the serving UE 2-1. However, the transmission timing of the SRS is not limited thereto, and it is sufficient if the transmission timing of the SRS is the timing agreed in advance by the eNB 1-1 and the serving UE 2-1. However, it is preferable that the transmission timing of the SRS exists at least once in a time of one frame.

In the aforementioned embodiments, the TDD-LTE radio communication system was described. However, the present invention can be applied in the same manner to all radio communication systems in which asymmetric radio communication in which a frequency band of an uplink radio signal to be assigned to a radio terminal is different from a frequency band of a downlink radio signal is employed.

As described above, it must be understood that the present invention includes various embodiments and the like which are not described herein. Therefore, the present invention shall be only limited by the scope of the claims and matters specifying the invention, which are appropriate from this disclosure. Note that the entire contents of the Japanese Patent Application No. 2010-264390 (filed on Nov. 26, 2010) and the Japanese Patent Application No. 2010-264391 (filed on Nov. 26, 2010) are incorporated herein by reference.

INDUSTRIAL APPLICABILITY

The present invention can determine an appropriate modulation scheme without reducing throughput.

The invention claimed is:

1. A radio base station that communicates by TDD (Time Division Duplex) and communicates by OFDMA (Orthogonal Frequency Division Multiple Access) in downlink radio communication, comprising:
   a receiver that receives quality information from a radio terminal, and
   a processor that assigns a first downlink radio resource to the radio terminal in response to switching of a frequency of a reference signal from the radio terminal and determines a modulation scheme in the first downlink radio resource on the basis of the quality information of a downlink radio resource assigned to the radio terminal in the past, wherein
   the quality information is information indicating quality of a second downlink radio resource and is based on a value weighted depending on an elapsed time from acquirement of the quality of the second downlink radio resource,
   a temporal position of the second downlink radio resource is equal to a temporal position of the first downlink radio resource in a period of a reception cycle of the reference signal, and
   a frequency band of the second downlink radio resource is equal to a frequency band of the first downlink radio resource.

2. The radio base station according to claim 1, wherein the processor determines the modulation scheme in the first downlink radio resource on the basis of latest quality information among a plurality of the quality information acquired for the second downlink radio resource in the past.

3. The radio base station according to claim 1, wherein the processor determines the modulation scheme in the first downlink radio resource on the basis of an average value of values of quality indicated by a plurality of the quality information acquired for the second downlink radio resource in the past.

4. The radio base station according to claim 1, wherein the processor determines the modulation scheme in the first downlink radio resource on the basis of a weighted average value of values of quality indicated by a plurality of the quality information acquired for the second downlink radio resource in the past, in which a weighting coefficient is increased as the elapsed time from acquirement of the plurality of the quality information is shorter.

5. A communication control method in a radio base station that communicates by TDD (Time Division Duplex) and communicates by OFDMA (Orthogonal Frequency Division Multiple Access) in downlink radio communication; comprising:
   a step of receiving quality information from a radio terminal,
   a step of assigning a first downlink radio resource to the radio terminal in response to switching of a frequency of a reference signal from the radio terminal, and
   a step of determining a modulation scheme in the first downlink radio resource on the basis of the quality information of a downlink radio resource assigned to the radio terminal in the past, wherein
   the quality information is information indicating quality of a second downlink radio resource and is based on a value weighted depending on an elapsed time from acquirement of the quality of the second downlink radio resource,
   a temporal position of the second downlink radio resource is equal to a temporal position of the first downlink radio resource in a period of a reception cycle of the reference signal, and
   a frequency band of the second downlink radio resource is equal to a frequency band of the first downlink radio resource.

6. A radio base station that communicates by TDD (Time Division Duplex) and communicates by OFDMA (Orthogonal Frequency Division Multiple Access) in downlink radio communication, comprising:
   a receiver that receives quality information from a radio terminal, and
   a processor that assigns a first downlink radio resource to the radio terminal in response to switching of a frequency of a reference signal from the radio terminal and determines a modulation scheme in the first downlink radio resource on the basis of the quality information of a downlink radio resource assigned to the radio terminal in the past, wherein
   the quality information is information indicating quality of a second downlink radio resource and is based on a value weighted depending on an elapsed time from acquirement of the quality of the second downlink radio resource,
   a temporal position of the second downlink radio resource is equal to a temporal position of the first downlink radio resource in a period of a reception cycle of the reference signal, and
   a frequency band of the second downlink radio resource is different from a frequency band of the first downlink radio resource.

7. The radio base station according to claim 6, wherein the processor determines the modulation scheme in the first downlink radio resource on the basis of latest quality information among a plurality of the quality information acquired for the second downlink radio resource in the past.

8. The radio base station according to claim 6, wherein the processor determines the modulation scheme in the first downlink radio resource on the basis of an average value of values of quality indicated by a plurality of the quality information acquired for the second downlink radio resource in the past.

9. The radio base station according to claim 6, wherein the processor determines the modulation scheme in the first downlink radio resource on the basis of a weighted average value of values of quality indicated by a plurality of quality information acquired for the second downlink radio resource in the past, in which a weighting coefficient is increased as an elapsed time from acquirement of the plurality of quality information is shorter.

10. A communication control method in a radio base station that communicates by TDD (Time Division Duplex) and communicates by OFDMA (Orthogonal Frequency Division Multiple Access) in downlink radio communication; comprising:
    a step of receiving quality information from a radio terminal,
    a step of assigning a first downlink radio resource to the radio terminal in response to switching of a frequency of a reference signal from the radio terminal, and
    a step of determining a modulation scheme in the first downlink radio resource on the basis of the quality information of a downlink radio resource assigned to the radio terminal in the past, wherein
    the quality information is information indicating quality of a second downlink radio resource and is based on a value weighted depending on an elapsed time from acquirement of the quality of the second downlink radio resource, a temporal position of the second downlink radio resource is equal to a temporal position of the first downlink radio resource in a period of a reception cycle of the reference signal, and a frequency band of the second downlink radio resource is different from a frequency band of the first downlink radio resource.

* * * * *